(12) United States Patent
Van Blaricom (10) Patent No.: US 10,787,965 B1
(45) Date of Patent: Sep. 29, 2020

(54) ADVANCED GAS TURBINE ENGINE

(71) Applicant: Terry Michael Van Blaricom, Sherman Oaks, CA (US)

(72) Inventor: Terry Michael Van Blaricom, Sherman Oaks, CA (US)

( * ) Notice: Subject to any disclaimer, the term of this patent is extended or adjusted under 35 U.S.C. 154(b) by 0 days.

(21) Appl. No.: 15/929,669

(22) Filed: May 14, 2020

(51) Int. Cl.
| | |
|---|---|
| *F02C 7/18* | (2006.01) |
| *F01D 25/12* | (2006.01) |
| *F02C 7/36* | (2006.01) |
| *F02K 3/075* | (2006.01) |

(52) U.S. Cl.
CPC .............. *F02C 7/18* (2013.01); *F01D 25/12* (2013.01); *F02C 7/36* (2013.01); *F02K 3/075* (2013.01); *F05D 2240/11* (2013.01); *F05D 2260/202* (2013.01); *F05D 2260/213* (2013.01)

(58) Field of Classification Search
CPC .......... F05B 2240/241; F05B 2240/242; F01D 1/026; F01D 1/06; F01D 9/02; F01D 9/04; F01D 9/06; F01D 25/12; F01D 25/14; F01D 9/023; F02C 7/18
See application file for complete search history.

(56) References Cited

U.S. PATENT DOCUMENTS

| | | | |
|---|---|---|---|
| 2003/0230070 A1* | 12/2003 | Platts | F02C 3/073 60/39.43 |
| 2017/0292350 A1* | 10/2017 | Weflen | F02C 1/02 |
| 2019/0063313 A1* | 2/2019 | Rez | F02C 7/14 |

* cited by examiner

*Primary Examiner* — Scott J Walthour
*Assistant Examiner* — Todd N Jordan (57) ABSTRACT

A gas turbine engine in which working gases are provided a linear path within turbine blade passageways of a power turbine in at least one dimension prior to the turning of working gases to provide rotational power. A fan causes cooling air to flow through turbine blade passageways that are not, at the time in the cycle of revolution of the power turbine, receiving a flow of working gases. After exiting said turbine blade passageways, said cooling air mixes with spent working gases, lowering the temperature of the exhaust.

3 Claims, 6 Drawing Sheets

SECTION C-C

ADVANCED GAS TURBINE ENGINE

FIELD OF THE INVENTION

The field of the invention is the gas turbine engine, and in particular, gas turbine engines in which a flow of air is provided to cool blades of a power turbine.

DESCRIPTION OF THE PRIOR ART

There have been many methods of providing air to cool the parts of power turbines in gas turbine engines, with most using hot, high pressure air from the compressor to cool the even hotter parts of the power turbine. Some have provisions to direct cooler, near ambient air to parts of a power turbine that are not under the pressure of working gases. The following are examples of these methods.

U.S. Pat. No. 8,684,666 Mara, Apr. 12, 2011. Low pressure system seals inner aspects of a rotor system from hot gases.

U.S. Pat. No. 10,648,363 McMahon et al, Dec. 28, 2017, provides film cooling holes in turbine blades.

U.S. Pat. No. 10,648,344 Pitt, Apr. 5, 2018, provides chambers within a turbine blade for the flow of cooling air.

U.S. Pat. No. 10,648,345 Whitfield et al, Dec. 5, 2017, provides passages within turbine airfoils for the flow of cooling air.

U.S. Pat. No. 8,770,936 Liang, Nov. 22, 2010, has serpentine flow cooling channels to cool the airfoils of a turbine.

U.S. Pat. No. 9,745,853 Lee et al, Aug. 31, 2015, has a cooling circuit within blades that flows aft with at least two substantially 180-degree turns.

BACKGROUND OF THE INVENTION

Gas turbine engines exhibit increased fuel efficiency when high working gas temperatures can be used for the development of power. The use of high working gas temperatures does however require that the blades of a power turbine be fabricated from high temperature alloys, so that deterioration or melting does not occur. Some gas turbines are able to withstand even higher working gas temperatures when a portion of air from the engine's compressor is diverted to cool the blades. The cooling comes at a cost however, as the compression of air requires a considerable amount of the engine's power. Compression of the air also raises the temperature of the air a significant amount. Cooling has to be provided with air that is at a very high temperature. That any cooling is accomplished at all is due to the blades being at an even higher temperature than air provided by the compressor. The present invention provides a significantly more efficient way of cooling the blades of a power turbine.

The formula for the extraction of power by a single stage of a power turbine in a gas turbine engine shows that the larger the angle of turning of working gases within the blade passages, the higher the power and fuel efficiency. Various nozzle and blade designs have been produced in the past, but none have shown to be efficient in a single stage. The present invention provides a method of significantly increasing power and fuel efficiency in a single stage.

If a gas turbine is to be used to power hybrid automobiles, trucks, and small electrical generators as many have envisioned, the dangerously high exhaust temperature has to be reduced significantly. The present invention provides a method of reducing the exhaust temperature without having to use a regenerator.

SUMMARY OF THE INVENTION

A primary object of the invention is to provide a gas turbine engine in which working gases flow through turbine blade passageways a portion of the time within in a cycle of revolution of a power turbine, and cooling air from a fan is made to flow through the turbine blade passageways a remainder of the time, for the purpose of cooling the blades of the power turbine.

Another object of the invention is to provide a gas turbine engine in which blades of a power turbine are provided cooling air by a centrifugal fan that is integral to the power turbine.

Another object of the invention is to provide a gas turbine engine in which entry portions of turbine blade passageways have at least one linear wall that, in concert with a linear wall of a working gas nozzle, provides a linear path for working gases within the entry portions of turbine blade passageways prior to a turning of working gases within the turbine blade passageways, when viewed from a perspective that is perpendicular to an axis of the power turbine.

Another object of the invention is to provide a gas turbine engine in which a fan causes cooling air to flow through a portion of turbine blade passageways at times in a cycle of revolution of a power turbine that the portion of turbine blade passageways are not receiving working gases from a nozzle, to allow blades of the power turbine to withstand higher working gas temperatures for the purpose of increasing fuel efficiency.

Another object of the invention is to provide a gas turbine engine in which a fan causes cooling air to flow through a portion of turbine blade passageways at times in a cycle of revolution of a power turbine that the portion of turbine blade passageways are not receiving working gases from a nozzle, the flow of cooling air mixing with spent working gases after exiting the portion of turbine blade passageways to provide cooling to the spent working gases, thereby reducing the temperature of the exhaust.

Another object of the invention is to provide a working gas nozzle for a gas turbine engine that is cut at an angle to allow close-coupling to entry portions of turbine blade passageways that are in proximity to the working gas nozzle at a time in a cycle of revolution of a power turbine.

Another object of the invention is to provide a gas turbine engine in which a fan causes a flow of cooling air through turbine blade passageways to cool blades of a power turbine, at times in a cycle of revolution of the power turbine that the turbine blade passageways are not receiving working gases from a working gas nozzle, to allow the blades of the power turbine to be fabricated from economical lower temperature-rated materials.

DESCRIPTION OF THE PREFERRED EMBODIMENT

Figure 1:
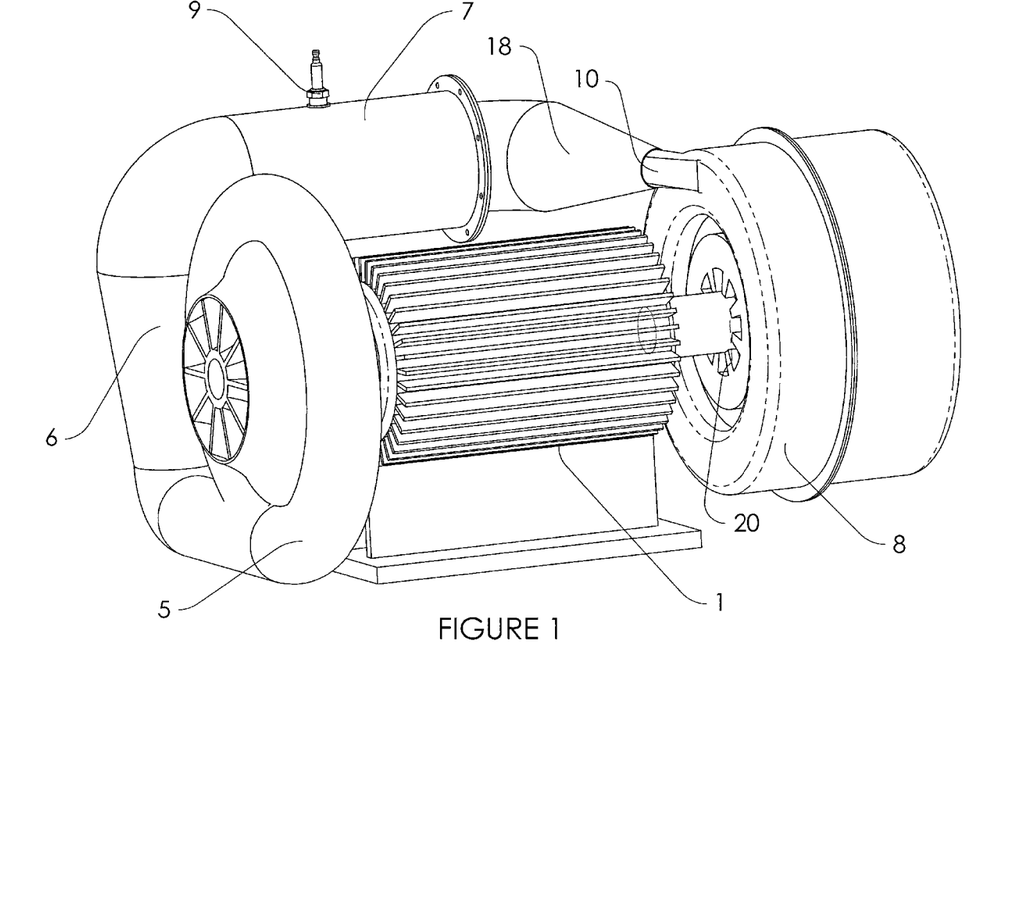
FIG. 1 shows a view of a preferred embodiment of the invention
Figure 2:
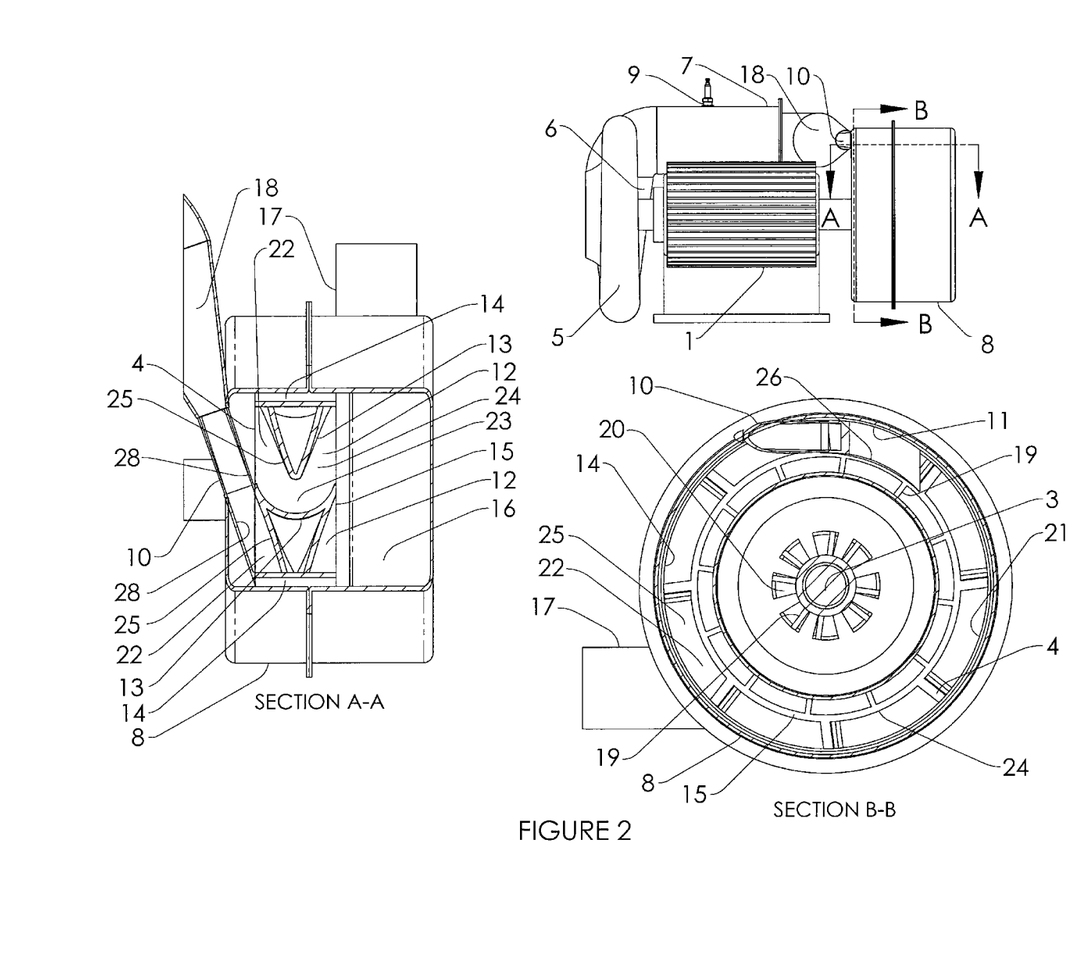
FIG. 2 shows the preferred embodiment in a front view perspective, with section A-A showing a section view through a nozzle and turbine blade passageways from a top view perspective and section B-B showing a section view of the nozzle and portions of a centrifugal fan and power turbine from a side view perspective.
Figure 3:
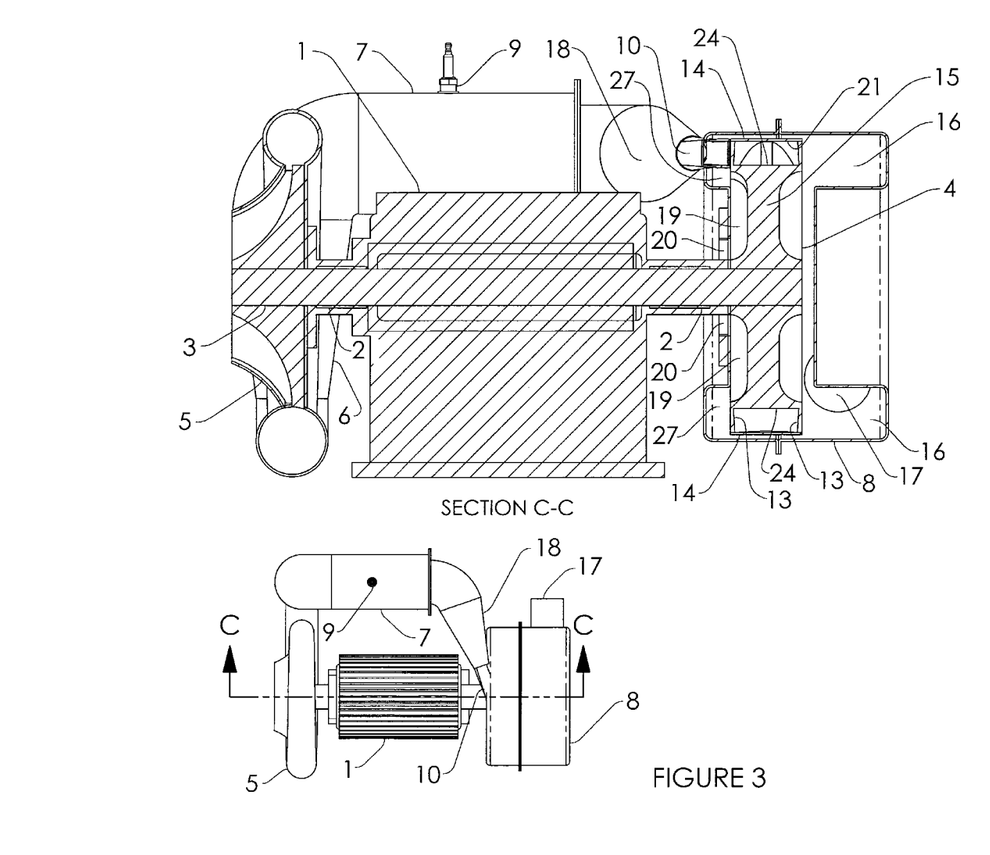
FIG. 3 shows the preferred embodiment from a top view perspective, with section C-C taken through an axis of a shaft in a front view perspective.
Figure 4:
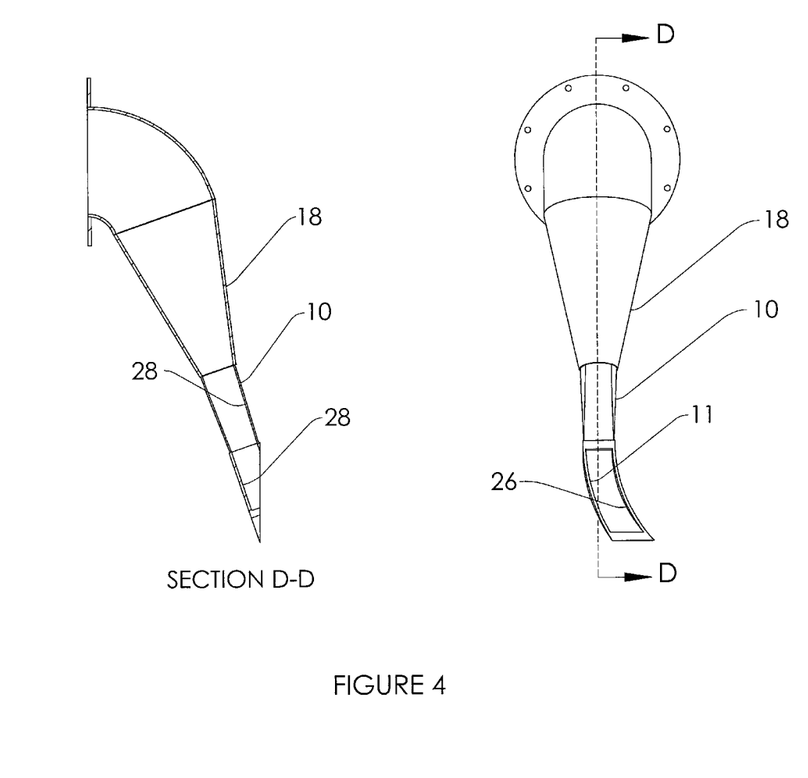
FIG. 4 shows a view of a nozzle found in the preferred embodiment, along with a section view of the nozzle.
Figure 5:
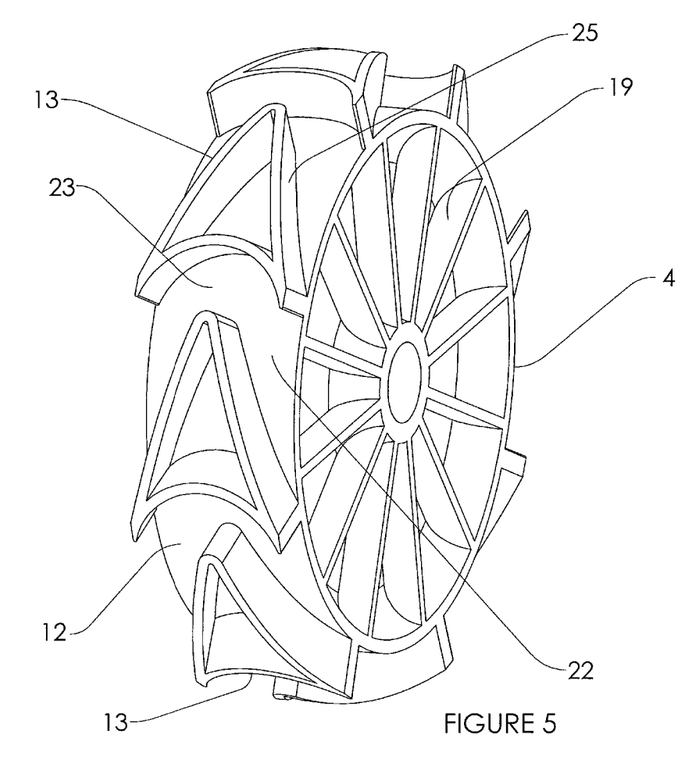
FIG. 5 shows a power turbine of the preferred embodiment, without shroud.
Figure 6:
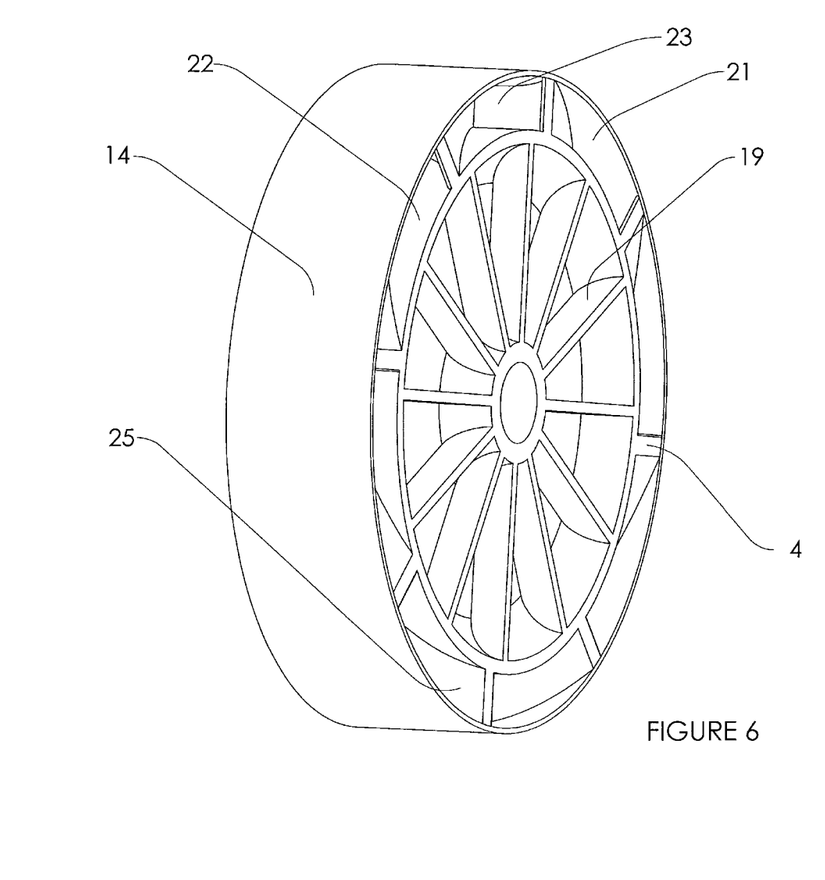
FIG. 6 shows a power turbine of the preferred embodiment, with shroud.

In Operation;

A battery (not shown) provides power to a starter-generator 1 that turns a shaft 3 that rotates within plain bearings 2 that are contained within a casing of the starter-generator 1, the shaft 3 being connected to a power turbine 4 that is contained within a power turbine casing 8 at one end and a centrifugal compressor 5 at the other, the centrifugal compressor 5 providing compressed air through a diffuser 6 to a burner 7, the compressed air forming a mixture with fuel supplied by a fuel system (not shown) within the burner 7, the mixture being ignited by an igniter 9 to form a flame of combustion, the flame of combustion providing heat to expand the compressed air and gases of combustion within the burner 7, the total of the compressed air and the gases of combustion being hereinafter defined as working gases. The working gases exit the burner 7 through a converging pipe 18 prior to entering a working gas nozzle 10, the converging pipe 18 providing an increase in speed of the working gases prior to entry into the working gas nozzle 10. When viewed from a perspective that is linear to an axis of the power turbine 4, an inner surface of a radially outermost wall of a curved section 11 of the working gas nozzle 10 is of the same radius as a turbine blade shroud inner wall 21, and an inner surface of a radially innermost wall of a curved section 26 of the working gas nozzle 10 is of the same radius as a turbine disk outer wall 24. The working gases exit the working gas nozzle 10 into and through a turbine blade passageways entry portion 22 of those turbine blade passageways 12 that are, at a time in a cycle of revolution of the power turbine 4, in proximity to the working gas nozzle 10. The turbine blade passageways entry portion 22 has at least one linear wall 25 that is substantially co-linear with linear working gas nozzle walls 28 when in proximity to the working gas nozzle 10 when viewed from a perspective that is perpendicular to the axis of the power turbine 4. The working gas nozzle 10 is cut at an angle when viewed from the perspective that is perpendicular to the axis of the power turbine 4 to allow close-coupling to the power turbine 4. The turbine blade passageways 12 are defined by turbine blades 13 which are hollowed to save weight, a plurality of which are radially dispersed around the turbine disk outer wall 24. When viewed from the perspective that is perpendicular to the axis of the power turbine 4, the working gases flow in a linear path within the working gas nozzle 10 to enter and flow through the turbine blade passageways entry portions 22 in a flow path that is substantially co-linear to a flow path of working gases within the working gas nozzle 10. Linear flow of the working gases is directed by linear working gas nozzle walls 28 and at least one linear wall 25 of the turbine blades defining the turbine blade passageways entry portion 22. When viewed from a perspective that is linear to the axis of the power turbine 4, the working gases flow in a curved path through the working gas nozzle 10 into and through the turbine blade passageways entry portion 22, following the radii of walls defined by the inner surface of the radially innermost wall of the curved section 26 of the working gas nozzle 10, the inner surface of the radially outermost wall of the curved section 11 of the working gas nozzle 10, the turbine blade shroud inner wall 21, and the turbine disk outer wall 24. The working gases flow through the turbine blade passageways entry portion 22 of the turbine blade passageways 12 to a turbine blade passageways bend 23, which provides a turning of the working gases through a large angle, the turning of the working gases causing an inertial effect to the power turbine 4 that provides rotational power. The large angle of turning creates significantly more work than lesser angles of turning found in power turbines now in use. After turning is accomplished, spent working gases exit into a spent gases collection area 16 to then exit via an exhaust pipe 17 to the atmosphere. The power turbine 4 transmits rotational power via the shaft 3 to the centrifugal compressor 5 and the starter-generator 1, which provides electrical power in addition to that required to charge the battery. Rotational power can also be transmitted by an extension (not shown) of the shaft 3 to provide power for uses other than electrical power generation. A centrifugal cooling air fan having centrifugal cooling air fan blades 19 that are integral to the power turbine disk 15 uses a portion of the rotational power of the power turbine 4 to cause a flow of cooling air to move through the turbine blade passageways 12 at times in the cycle of revolution of the power turbine 4 that the turbine blade passageways 12 are not adjacent to the working gas nozzle 10 and therefore not exposed to the flow of working gases. Air from the atmosphere enters the radially inner portion of the centrifugal cooling air fan through cooling air entry ducts 20 cut through the power turbine casing 8, and is moved radially outward by centrifugal force within the centrifugal cooling air fan blades 19 to a cooling air diffusion area 27, where the cooling air is provided a pressure increase by the process of diffusion. The pressure increase provides enough pressure to cause the cooling air to flow through the turbine blade passageways 12 that are not at the time in the cycle of rotation of the power turbine 4, in the flow path of working gases from the working gas nozzle 10. Upon exiting the turbine blade passageways 12, the cooling air mixes with spent working gases within the spent gasses collection area 16, subsequently exiting to the lower pressure of the atmosphere through the exhaust pipe 17. The cooling air flows through the turbine blade passageways 12 to provide cooling to the turbine blades 13, the turbine disk outer wall 24, and the turbine blade shroud inner wall 21, which form the walls of the turbine blade passageways 12 until the time in the cycle of revolution of the power turbine that the turbine blade passageways 12 are again provided with working gases by the working gas nozzle 10.

Others may conceive of different configurations of the present invention, some of which may include the following:

The preferred embodiment of the present invention uses a single burner 7 and a single working gas nozzle 10 to provide working gases to turbine blade passageways 12, however multiple working gas nozzles, radially dispersed about a power turbine 4, each being provided working gases by it's own burner 7 could be used to increase power relative to the diameter of the power turbine 4. Also, a single burner 7 could be used to feed multiple working gas nozzles, radially disbursed about the power turbine 4, the working gas nozzles providing working gases to only a portion of the turbine blade passageways 12 during a cycle of revolution of the power turbine 4, with the remaining turbine blade passageways 12 open to accept cooling air from a fan, the concept of which defines an important feature of the present invention.

The preferred embodiment of the present invention uses a centrifugal cooling air fan whose centrifugal cooling air fan blades 19 are integral to a power turbine disk 15, however other types of fans could also be used that are integral to or separate from the power turbine disk 15.

The preferred embodiment of the present invention provides cooling air to turbine blade passageways 12 that, upon exit from the turbine blade passageways 12, mixes with spent working gases within a spent working gases collection area 16, to cool the spent gases prior to exiting an exhaust pipe 17. This provides a cool exhaust without having to use a regenerator, however, a regenerator could be used with the present invention by reducing the flow of cooling air to the turbine blades, thereby raising the temperature of the exhaust to provide heat for regeneration.

The provision of an axial tilt to turbine blade passageways 12 of the present invention, with an exit of the turbine blade passageways 12 being at a larger radius relative to an axis of a power turbine 4 than an entry of the turbine blade passageways 12, could also provide a centrifugal force to air within the turbine blade passageways 12, to assist in the movement of cooling air as well as the purge of working gases.

The present invention could also use cooling air nozzles that are provided air by a remote fan, the cooling air nozzles being in gaseous communication with turbine blade passageways 12 that are not at a time in a cycle of revolution of a power turbine, receiving working gases.

The preferred embodiment of the present invention uses a turbine blade shroud 14 that is affixed to and revolves with the turbine blades 13, with a turbine blade shroud inner wall 21 defining the radially outermost wall of turbine blade passageways 12. The turbine blade shroud 14 is utilized to reduce the need for structure and precision in a power turbine casing 8. A non-rotating radially outermost wall of the turbine blade passageways 12, integral to the power turbine casing 8 and separated from the turbine blades 13 by a small gap could also be used as is common in the art.

What is claimed is:

1. A gas turbine engine comprising:
    a compressor;
    a diffuser;
    a burner;
    a converging pipe;
    a working gas nozzle;
    a power turbine;
    a power turbine casing;
    a cooling air fan;
    a spent gases collection areas;
    an exhaust pipe;
    a starting device;
    a shaft;
    at least one bearing;
    and a starting device casing for the starting device, the shaft and the at least one bearing;
    wherein an inlet of the compressor is in gaseous communication with the atmosphere and an outlet of the compressor is in gaseous communication with an inlet of the diffuser, wherein an outlet of the diffuser is in gaseous communication with an inlet of the burner, wherein an outlet of the burner is in gaseous communication with an inlet of the converging pipe, and wherein an outlet of the converging pipe is in gaseous communication with the an inlet of the working gas nozzle;
    wherein the burner comprises a controlled supply of fuel, a capability of mixing the fuel with air, and a capability of igniting a resultant mixture;
    wherein the power turbine comprises turbine blades, a turbine disk, and a turbine blade shroud, wherein the turbine blades are radially dispersed around and fixedly attached to a radially outermost wall of the turbine disk, wherein the turbine blade shroud is fixedly attached to a radially outermost periphery of the turbine blades, or fixedly attached to the power turbine casing and separated from the turbine blades by a gap;
    wherein a radially innermost wall of the turbine blade shroud, the radially outermost wall of the turbine disk and walls of the turbine blades define turbine blade passageways between adjacent turbine blades;
    wherein the working gas nozzle has an outlet that is cut at an angle to the power turbine and coupled to the power turbine;
    wherein the outlet of the working gas nozzle is in gaseous communication with and directs working gases through inlets of only a first quantity of the turbine blade passageways, wherein the first quantity of the turbine blade passageways correspond to at least one first turbine blade passageway that is in the path of working gases flowing from the working gas nozzle at a given time during operation of the gas turbine engine;
    wherein outlets of the first quantity of the turbine blade passageways are in gaseous communication with and provide spent gases to the spent gases collection area, wherein the spent gases collection area is defined by walls of the power turbine casing;
    wherein the spent gases collection area is in gaseous communication with an inlet of the exhaust pipe;
    wherein an outlet of the exhaust pipe is in gaseous communication with the atmosphere;
    wherein the cooling air fan has an inlet in gaseous communication with the atmosphere and an outlet in gaseous communication with, and configured to provide a flow of cooling air through, inlets of a second quantity of the turbine blade passageways, wherein the second quantity of the turbine blade passageways correspond to at least one second turbine blade passageway that is not in the path of working gases flowing from the working gas nozzle at the given time during operation of the gas turbine engine;
    wherein the second quantity of the turbine blade passageways are configured to receive the flow of cooling air from a cooling air plenum;
    wherein the cooling air plenum is defined on a forward side, a radially inner side, and a radially outer side by walls of the power turbine casing and on an aft side by the second quantity of the turbine blade passageways; and
    wherein the flow of cooling air exits the second quantity of the turbine blade passageways through outlets of the second quantity of the turbine blade passageways and mixes with spent gasses in the spent gases collection area before exiting the spent gases collection area through the exhaust pipe to the atmosphere.

2. The gas turbine engine as claimed in claim 1 wherein the cooling air fan is integral to the turbine disk.

3. The gas turbine engine as claimed in claim 1 wherein the working gas nozzle comprises:
    a curved section;
    wherein a radially outermost inner wall of the curved section of the working gas nozzle comprises the same radius as the radially innermost wall of the turbine blade shroud;
    wherein a radially innermost inner wall of the curved section of the working gas nozzle comprises the same radius as the radially outermost wall of the turbine disk;

wherein the working gas nozzle further comprises a linear section with substantially linear walls providing a substantially linear flow of working gases to an entry portion of the turbine blade passageways;

wherein the entry portion of the turbine blade passageways comprises at least one substantially linear wall that provides a substantially linear flow of working gases within the first quantity of the turbine blade passageways prior to a turning of the working gases within the turbine blade passageways.

* * * * *